US009673723B2

(12) United States Patent
Mancic et al.

(10) Patent No.: US 9,673,723 B2
(45) Date of Patent: Jun. 6, 2017

(54) CIRCUIT ADAPTED TO SUPPLY A VOLTAGE TO AN ELECTRONIC DEVICE AND USES THEREOF

(76) Inventors: Milan Mancic, Subotica (RS); Nicholas Møller, Sibenik (HR)

(*) Notice: Subject to any disclaimer, the term of this patent is extended or adjusted under 35 U.S.C. 154(b) by 399 days.

(21) Appl. No.: 14/110,842

(22) PCT Filed: Apr. 13, 2012

(86) PCT No.: PCT/DK2012/000038
§ 371 (c)(1),
(2), (4) Date: Dec. 17, 2013

(87) PCT Pub. No.: WO2012/139576
PCT Pub. Date: Oct. 18, 2012

(65) Prior Publication Data
US 2014/0145683 A1    May 29, 2014

(30) Foreign Application Priority Data

Apr. 15, 2011  (DK) .......................... PA 2011 00299
Jul. 22, 2011  (DK) .......................... PA 2011 00564

(51) Int. Cl.
*H02M 5/06*      (2006.01)
*H02J 7/00*      (2006.01)
(Continued)

(52) U.S. Cl.
CPC ............ *H02M 5/06* (2013.01); *H02J 7/0052* (2013.01); *H02M 3/07* (2013.01); *H02M 7/103* (2013.01);
(Continued)

(58) Field of Classification Search
CPC ............................... H02M 5/06; H02J 7/0052
(Continued)

(56) References Cited

U.S. PATENT DOCUMENTS 3,739,254 A * 6/1973 Kojima ................. H02M 7/103
                                                174/520
3,900,788 A * 8/1975 Behn ....................... H01L 25/11
                                                257/E25.024
(Continued)

FOREIGN PATENT DOCUMENTS

WO       97/16884 A1    5/1997
WO       2010143944     12/2010

*Primary Examiner* — Richard Isla Rodas
*Assistant Examiner* — Dung V Bui
(74) *Attorney, Agent, or Firm* — Dykema Gossett PLLC

(57) ABSTRACT

In a circuit adapted to supply a voltage $V_s$ an electronic device, such as a load or a light source said voltage $V_s$ is led to a circuit (ACG) that is able to derive a voltage $V_{ACG}$ from $V_s$ where $V_{ACG} \neq V_s$. The circuit consist in a first embodiment of three serial coupled diodes (D1,D2,D3) and two capacitors (C1,C2), and where the capacitor (CI) is coupled in parallel with tow of the diodes (D1,D2) and the capacitor (C2) is coupled in parallel with the diodes (D2,D3). In this way an Asymmetric Current Generator (ACG) is provided, that from a normal periodic source voltage $V_s$ can derive two voltages both of which are suitable for a rechargeable battery or a light source. In this way a cost effective voltage in which the voltage required for the electronic device is beneficial for recharging the battery or strengthen the light for a LED light source leading to save in current cost and a fast recharging of the rechargeable battery and gaining light from the light source. The invention also covers uses of the Asymmetric Current Generator (ACG).

6 Claims, 13 Drawing Sheets

(51) Int. Cl.
*H02M 3/07* (2006.01)
*H02M 7/10* (2006.01)
*H05B 33/08* (2006.01)

(52) U.S. Cl.
CPC ..... *H05B 33/0809* (2013.01); *H05B 33/0821* (2013.01); *Y02B 20/342* (2013.01)

(58) Field of Classification Search
USPC .................................. 320/139; 323/364, 355
See application file for complete search history.

(56) References Cited

U.S. PATENT DOCUMENTS

| | | | |
|---|---|---|---|
| 3,927,364 A * | 12/1975 | Bauer | H02M 7/106 363/60 |
| 4,040,000 A * | 8/1977 | Dwivedi | G01V 1/157 315/238 |
| 5,587,893 A | 12/1996 | Teng | |
| 5,994,843 A * | 11/1999 | Kataoka | H05B 41/28 315/106 |
| 6,348,818 B1 | 2/2002 | Filipovski | |
| 6,989,807 B2 * | 1/2006 | Chiang | H05B 33/083 315/291 |
| 7,719,202 B2 * | 5/2010 | Cheng | H05B 33/0818 315/224 |
| 7,881,209 B2 | 2/2011 | Beliles et al. | |
| 8,203,858 B2 * | 6/2012 | Hanington | H02M 7/106 363/61 |
| 2004/0051480 A1 * | 3/2004 | Hanisch | H05B 41/042 315/291 |
| 2004/0189555 A1 | 9/2004 | Capen et al. | |
| 2008/0252229 A1 | 10/2008 | Wu | |
| 2010/0270935 A1 * | 10/2010 | Otake | H05B 33/0803 315/185 R |
| 2014/0145683 A1 * | 5/2014 | Mancic | H02M 3/07 320/139 |

\* cited by examiner

CIRCUIT ADAPTED TO SUPPLY A VOLTAGE TO AN ELECTRONIC DEVICE AND USES THEREOF

BACKGROUND OF THE INVENTION

Field of the Invention

The invention relates to a circuit adapted to supply a voltage to an electronic device, such as a load $V_L$, the voltage being derived from a voltage Vs that has a periodic cycle with a period having a positive part and a negative part. The invention also relates to uses of the circuit.

The Prior Art

In consuming devices, such as mobile phones, it is normal practice to build into the device a rechargeable battery. Since a rechargeable battery to a mobile phone provides a voltage for operating the mobile phone and a voltage for recharging the battery as well, it is necessary to provide an output voltage from the battery that is higher than the voltage needed for the operating of the consuming device. So the difference between the charging voltage and the voltage for operating the consuming device provides an idea of how effective the charging process is. However, by applying a higher voltage to the consuming device than it is designed for, the effect of the overall system is reduced. By a simple energy calculation, it can be concluded that the efficiency is more or less proportional to the difference between the voltage used for recharging the battery and the voltage for operating the consuming device.

U.S. Pat. No. 3,927,364 discloses a voltage multiplier using passive components.

However, there is no disclosure of providing a circuit where it is possible at the output from the circuit to establish a normal operating voltage for a consuming device, and in addition thereto a voltage that is increased in relation to the operating voltage.

In lighting devices such as the type using LED diodes it is well known that they use low power consumption.

U.S. Patent Application Publication 2004/0189555 discloses a LED light source where the light source is supplied by an AC source that is connected to a multiplication circuit and a voltage regulator.

Even though such light emitting diodes (LED's) use lower power consumption than traditional bulbs, there is in modern society a demand to decrease power consumption no matter how low the actual consumption is.

It is therefore the object of the invention to improve the efficiency for a consuming device that uses a normal operating voltage and an increasing voltage derived from the operating voltage.

Another object is to improve a driver light for light-emitting diodes, which improves the light intensity under the consumption from a given voltage compared to the light intensity when using the same voltage without the circuit according to the invention.

SUMMARY OF THE INVENTION

This object is achieved in a circuit that is characterized in that the voltage $V_s$ is fed to a series coupling of the load $V_L$ and the input of a circuit, the circuit creates a voltage $V_{ACG}$ at the output $V_L$ where $V_{AcG} \neq V_s$, the circuit consist of a combined circuit having a serial part and a parallel part, and where the voltage $V_{AcG}$ is derived from the serial and the parallel part, the serial part being active in the positive part of the voltage $V_s$, whereas the parallel part is active in the negative part of the signal.

In this way it is possible from a voltage fed to a consuming device that uses an operating voltage further to provide a higher voltage, for instance to supply a voltage to a rechargeable battery or for driving LED diodes, leading to a higher efficiency of the consuming device or a light source using LED diodes as well.

A preferred practical way to implement the invention is that the combined circuit is an Asymmetric Current Generator that consists of three serial coupled diodes and two capacitors, where one of the capacitors is connected in parallel with two of the diodes, and the other capacitor is connected in parallel with two of the other diodes.

This is advantageous if it is desired to have a regulation of the time for charging the current from a source or if it is desirable to change the duty cycle ratio between charging and discharging the period.

It is further expedient if the combined circuit is an Asymmetric Current Generator that consists of two serial coupled diodes in series with a resistor or a coil and a diode and two capacitors where one of the capacitors is connected in parallel with one of the diodes and the resistor or the coil and the diode and the other capacitor is connected in parallel with the other diode and the resistor or the coil and the diode.

In this way, the result a multiplication of the applied voltage, given even more efficiency in terms of recharging.

For use of the invention in connection with light sources it is advantageous if it consists of a serial coupling of at least two light emitting diodes (LEDs) and one extra diode, the diodes are coupled to two impedances, where one of the impedances is connected in parallel with two of the diodes, and the other impedance is connected in parallel with two of the other diodes.

A preferred embodiment of the invention is when the extra diode is a light emitting diode (LED).

A simple and useful embodiment of the invention is when the impedances are capacitors.

To further improve the light intensity, it is favourable if the impedances are coils.

A practical embodiment of the invention is when it has eight light-emitting diodes and two switches, where one of the switches is connected in series with a load, and between the switches in parallel are coupled two serial couplings, each of which consists of four parallel coupled light-emitting diodes in series with a capacitor and when the two set of light-emitting diodes are coupled in series with a diode.

Further embodiments of the invention is are when at least a further Asymmetric Current Generator is connected in parallel with one or both of two of the diodes.

In an alternative embodiment, one of the capacitors in the Asymmetric Current Generator is connected between two of the diodes in a further Asymmetric Current Generator circuit, a higher charge due to the present of a plurality of capacitors is obtained, whereas the output voltage is lower, compared to that of other embodiments.

If the capacitor is coupled between one of the diodes in the Asymmetric Current Generator and the voltage $V_s$, a higher voltage from the Asymmetric Current Generator will be obtained, since during the positive part of $V_s$ only the capacitor will be charged to the same level as $V_s$.

The negative part of $V_s$ will charge the capacitors in the Asymmetric Current Generator, leading to an overall increasing in output voltage.

Practical example using the invention is when a capacitor is coupled between the voltage $V_s$ and the Asymmetric Current Generator and when a rechargeable battery is coupled between the voltage Vs and the Asymmetric Current Generator.

The embodiment wherein the voltage $V_s$ is connected to a series coupling of two diodes and a parallel coupling of the Asymmetric Current Generator and a capacitor, and where one terminal of the load is connected to the parallel coupling whereas the other terminal of the load is connected between the diodes, and when the voltage $V_s$ is connected to a series coupling of two diodes and a parallel coupling of two Asymmetric Current Generators, and where one terminal of the load is connected to the parallel coupling, whereas the other terminal is connected between the diodes, gives the possibility to avoid use of conventional rectifiers, when $V_s$ for instance has a sin waveform. Further, the earlier mentioned advantages of the circuit according to the invention, of generating a higher voltage from a lower supply voltage, is obtained as explained earlier.

Within the scope of the invention, it is an advantage to run the Circuit in a push/pull configuration, i.e., that Vs is a DC voltage VDC that is coupled in series with two switches and the load, and the Asymmetric Current Generator is connected in parallel with the switch and the load, and that $V_s$ is a DC voltage $V_{DC}$, that is coupled in parallel with the load and two switches and that the Asymmetric Current Generator is coupled between the switches.

When $V_s$ is a DC voltage that is coupled to the load through an inductor in series with a parallel coupling, consisting of a switch and a series coupling of the load and the Asymmetric Current Generator, a useful application in connection with a consuming device that has a lower operating voltage than that needed for the supply of voltage to recharging is obtained.

If the consuming device has an operating voltage that is higher or a similar voltage than the supply voltage, then an alternative preferred embodiment $V_s$ is a DC voltage $V_{DC}$ that is coupled to a coil that is coupled to a parallel coupling consisting of a series coupling of the load and the Asymmetric Current Generator, and a switch.

As mentioned the invention also covers a uses of the invention.

BRIEF DESCRIPTION OF THE DRAWINGS

The invention will now be explained in details, in which.

DETAILED DESCRIPTION OF THE DEPICTED EMBODIMENTS

Figure 1:
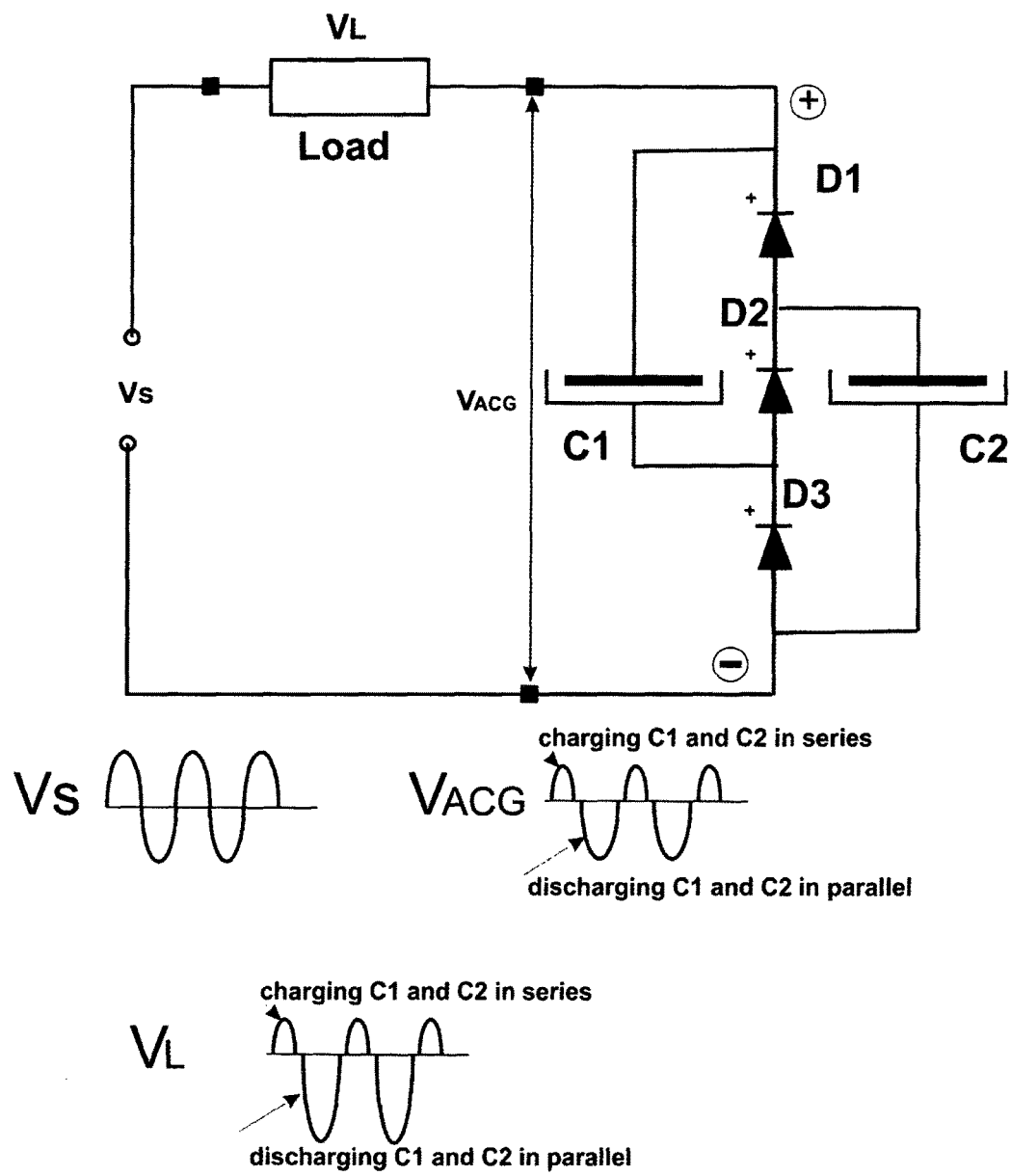
FIG. 1 shows the basic circuit of the Asymmetric. Current Generator according to the invention.

In FIG. 1 a circuit in the form of an Asymmetric Current Generator consisting of three diodes D1, D2, D3 are coupled in series. Two capacitors C1, C2 are coupled to the diodes, such that the capacitor C1 is coupled in parallel with the diodes D1,D2, whereas the capacitor C2 is coupled in parallel with the diodes D2 and D3.

This circuit is coupled to a voltage $V_S$ through the load $V_L$ said circuit operates as follows:

When the voltage $V_s$ is applied to the load $V_L$ a voltage $V_{ACG}$ is created at the output of the load $V_L$.

The voltage $V_s$, is on the figure shown as a periodic symmetric sin signal.

The circuit operates as follows:

When the upper terminal of $V_s$ is positive during the first half period, the capacitors C1, C2 will be charged during the first half period of $V_s$. The current will flow through the load $V_L$ and the serial part of the circuit consisting of the capacitor C1, the diode D2 and the capacitor C2, since diodes D1, D3 will not be open for current.

When the first period is terminated the Voltage $V_{ACG}$ will be the voltage $V_s$ divided by the amount of capacitors, which equals ½ $V_S$.

In the second period of the voltage $V_s$, the voltage $V_{ACG}$ will be controlled by the parallel circuit consisting of the capacitors C1, C2 and the diode D1 and the diode D3.

As shown on FIG. 1, it is seen that $V_L > V_s$ when $V_s$ is in the second period, because $V_L$, will be the sum of $V_s$ and $V_{ACG}$. It is noted that in the beginning of the first half period, the current to the capacitors will be maximum and determined by the resistance of the circuit. When the capacitors are fully charged the current will be minimum.

Below an example is given suggesting that $V_S$ is 9 Volt and the load $V_L$ is a 12 v Volt rechargeable battery. Normally it is not possible to recharge a 12 Volt battery with a 9 Volt source.

Figure 6:
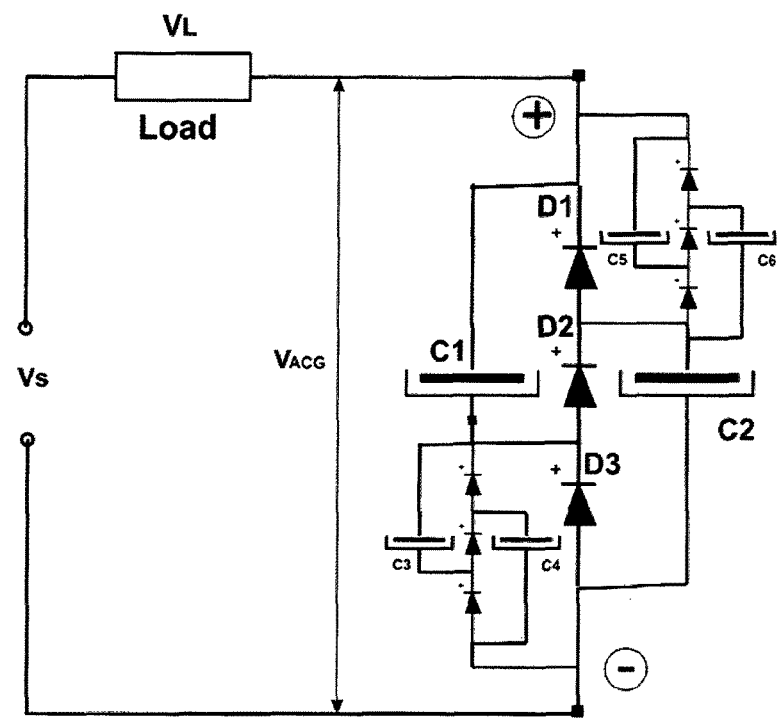
FIG. 6 shows the circuit in FIG. 1 in a multiplication version.

Due to the use of the circuit in FIG. 1, cf. also FIG. 6, it is possible to recharge the battery since during the charging of the capacitors C1, C2 they will get a voltage of 4.5 volt (=½$V_S$), said voltage will be added to the 9 volt source during the discharging of the capacitors C1, C2 and thereby creating 13.5 Volt for charging the battery.

Figure 2:
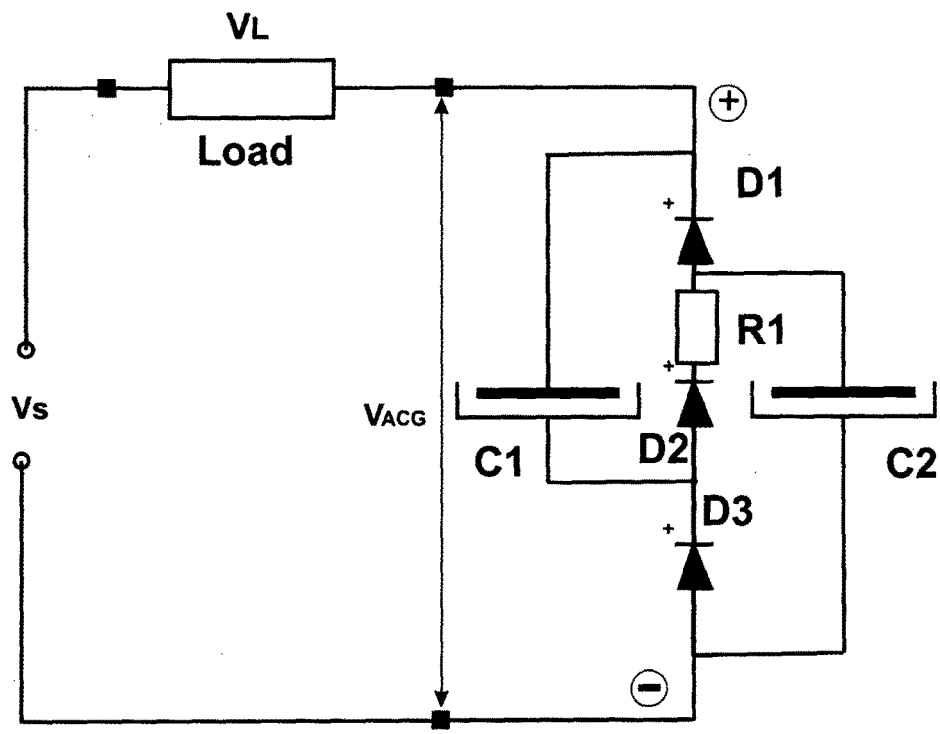
FIG. 2 shows a slightly modified embodiment of that in FIG. 1.

In FIG. 2 it is seen that the difference from FIG. 1 is that a resistor R1 or a coil (not shown) is connected in series with the diodes D1,D2,D3. The resistor D1 can be placed between D1 or D2 as shown on FIG. 2 or between D2 and D3.

It is also possible to place two resistors or two coils such that one will be connected between D1 and D2 and the other between D2 and D3.

By inserting the resistors or the coils this will change the time of charging the capacitors C1 and C2, but will have no effect for time of discharging the capacitors C1 and C2.

Figure 3:
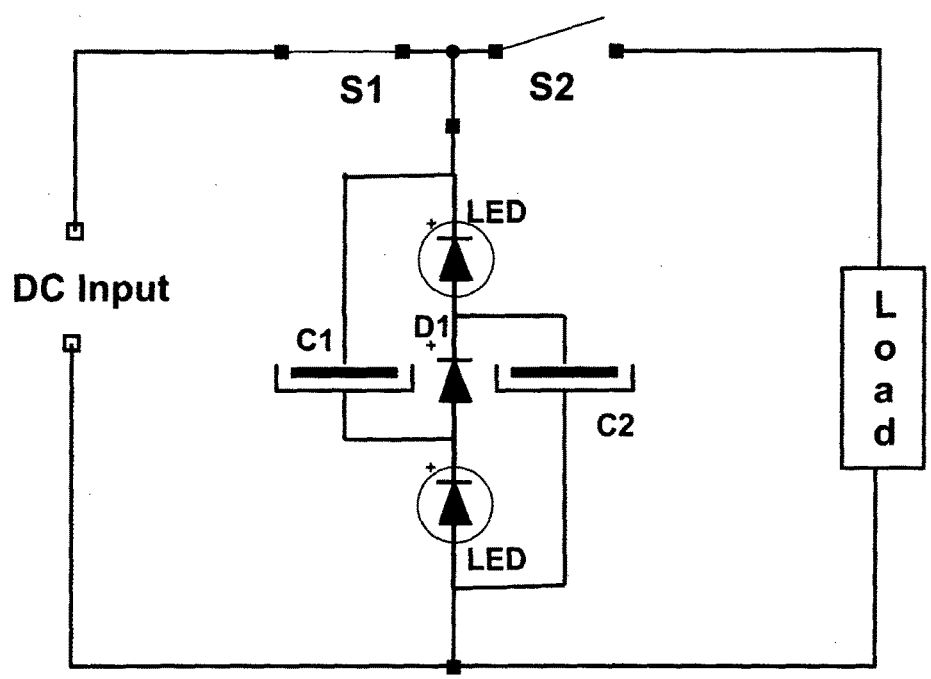
FIG. 3 shows a light source according to the invention.

Now coming to FIG. 3, it can be seen, that it differs from FIG. 1 in, that two of the diodes D1, D3 are replaced by light emitting diodes LED1, LED2.

Another difference is that the two switches S1 and S2 are connected in series with the DC input and a load, which can have the value 0.

These switches are asynchronic switches that could be powered by an external oscillator (not shown) at a frequency of f. inst. 5 MHz The serial coupling of the light emitting diodes LED1, and LED2 are coupled between the switches S1, S2.

This circuit operates as follows:

When S1 is on and S2 is off during the increasing part of the DC voltage, then the current will flow through capacitor C1, diode D1 and capacitor C2 leading to a value of the DC voltage plus half the DC voltage.

During the following decreasing part of the DC voltage, where the switch S1 is off and the switch S2 is on, then the capacitor C2 will discharge through the LED1 diode, whereas the capacitor C2 will discharge through the led 2 and the load.

In this way more power is drawn from the voltage DC leading to more intensive light compared to the situation where the three serial coupled diodes were coupled directly to the DC voltage.

It is noted, that it is possible also to replace the diode D1 with a LED diode, but this diode will emit lesser light, than the led diodes LED1 and LED2.

Figure 4:
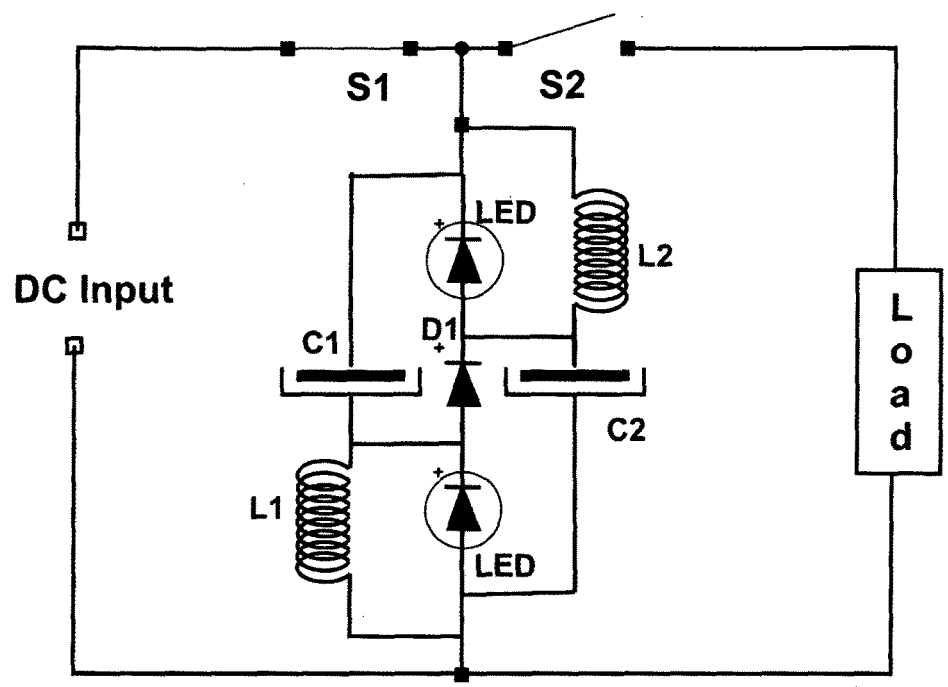
FIG. 4 shows another preferred embodiment of a light source according to the invention.

In order to gain more light form the LED diodes LED1, LED2, attention is drawn to FIG. 4.

The difference from the FIG. 3 embodiment is that two coils L1, L2 are coupled in parallel with led diode LED2 and LED diode LED1 respectively.

When switch S1 is on and switch S2 is off, the current in the increasing part of the DC voltage flows faster through capacitor C1, diode D1 and capacitor C2, than through the path coil L1, capacitor C1, and coil L2 and capacitor C2, due to the reason that the inductivity of the coils delays the current. This means that that the capacitors C1 and C2 will receive the first amount of charge in series until the delayed current through the coils gets a maximum charge when the increasing part of the voltage is finished In the decreasing part of the DC voltage the capacitors will receive charge from the coils leading to an overall stronger light emission from the Led diodes LED1 and LED2, compared to the FIG. 3 version.

It is noted that it is best, if the DC voltage has low inductivity for the reason that the coils L1, L2 will not be able to produce the same power if the DC voltage have some inductivity.

Figure 5:
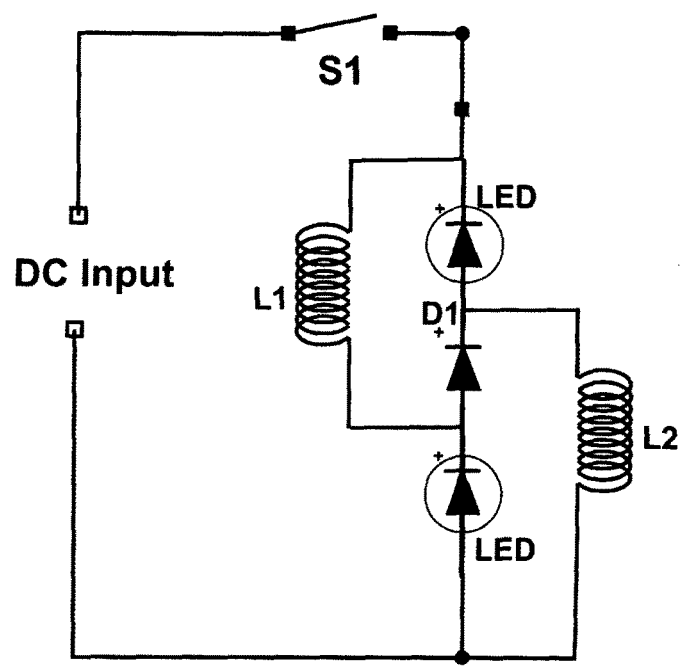
FIG. 5 shows a further embodiment of the invention.

The FIG. 5 embodiment differs from the FIG. 3. embodiment, in that the capacitors C1, C2 are replaced by coils L1, L2.

In this situation one switch S1 is coupled in series with the diodes LED1, D1 and LED2.

When S1 is on during the increasing part of the DC voltage current flows through coil L1 diode D1 and coil L2, leading to energizing the coils.

When the switch is off the coils will release stored energy through the led Diodes LED1 and LED2.

The FIG. 6 circuit differs from that in FIG. 1, that two similar ACG circuits respectively, are coupled between the diodes D1 and D2 and the positive part of $V_s$ and between the diodes D2,D3 and the negative part of $V_s$. The two capacitors in the ACG circuits are denoted C5, C6 and C3, C4 respectively.

In this circuit a faster charging of three capacitors C1, C2, C4 and C2, C5, C6 will be obtained, because they have a lower serial capacitance compared to the using of only two capacitors C1, C2 as shown in FIG. 1.

Similar when discharging the capacitors C3, C4 in parallel, they will add their voltage to C1 and in the same way capacitors C5, C6 will add their voltage to C2.

In summary a higher output of $V_{ACS}$ compared to the embodiment of FIG. 1 will be the result, or in other words, a multiplication of $V_s$ is achieved.

Figure 7:
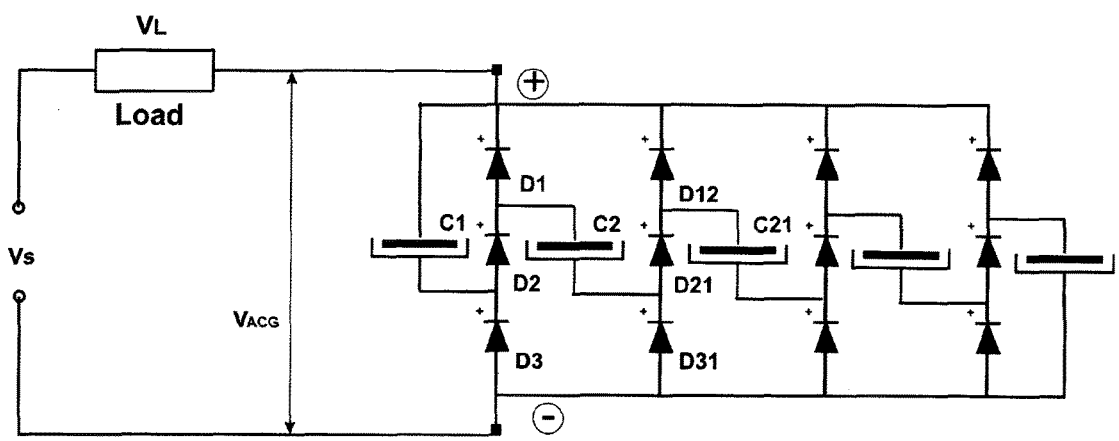
FIG. 7 shows the circuit in FIG. 1 in another multiplication version.

A variant of the FIG. 1 embodiment is shown in FIG. 7.

This embodiment also provides multiplication. As can be seen from FIG. 3 four ACG circuits are coupled in such a way, that capacitor C2 is coupled between diodes D21 and D31 to an ACG circuit having diodes D12, D21, D31 and capacitor C21. Another two ACG circuits are coupled in the same manner.

In this circuit multiplication is also provided by the plurality of ACG circuits.

The number of ACG circuits in this arrangement is determined by the value of Vs and the voltage drops in the diodes. The drop is determined by the minimum voltage required for getting the diodes in a conducting state.

If batteries are used in charging, they can receive charge from the series part of the ACG circuit and deliver charge from the parallel part of the ACG circuit In this way a higher charge is generated, but lower total output voltage is delivered.

Figure 8:
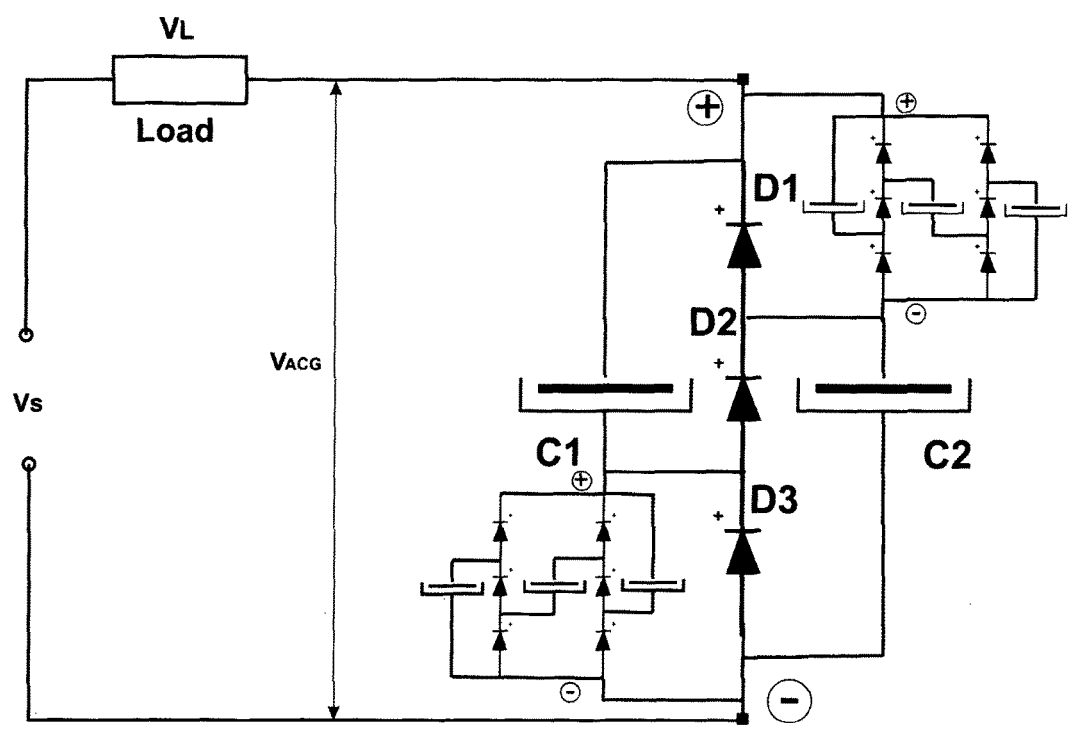
FIG. 8 shows a combination of the circuits in FIG. 2 and FIG. 3.

FIG. 8 shows a combination of the circuits in FIG. 6 and FIG. 7.

This configuration uses the results from FIG. 6 and FIG. 7 i.e. the FIG. 6 circuit provides a higher voltage output and lower charging amount and that the FIG. 7 circuit provides lower voltage output and higher charging amount. The combination results in a higher combined voltage and charging amount output.

Figure 9:
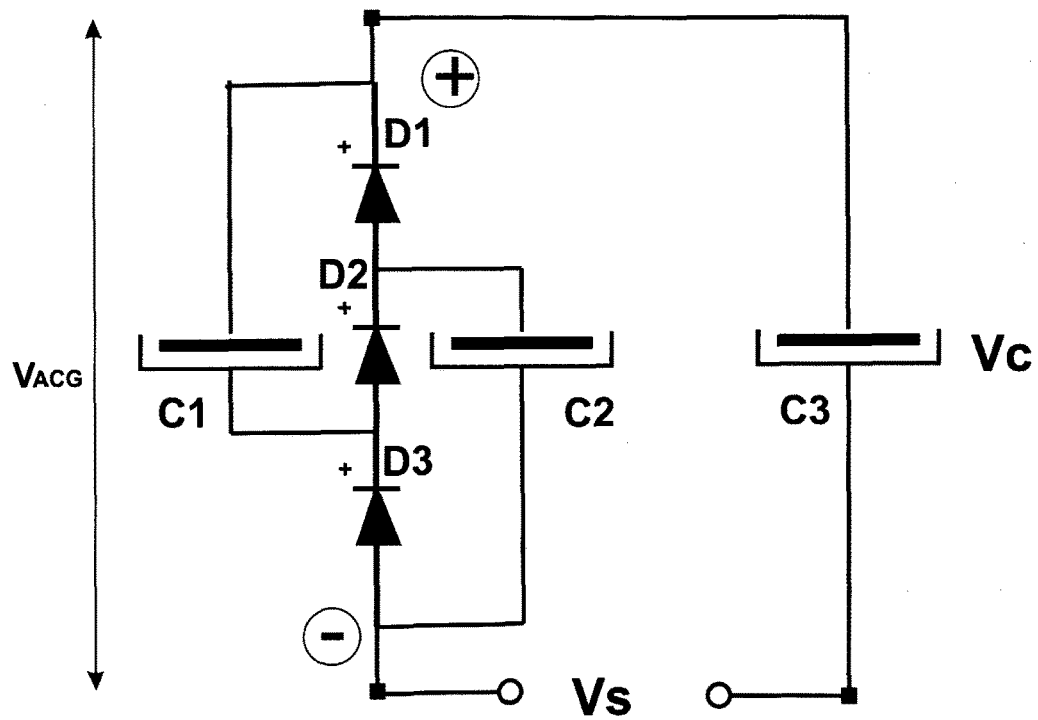
FIG. 9 shows an embodiment of the circuit in FIG. 1 in which a capacitor is coupled in parallel with the Asymmetric Current Generator.
Figure 9:
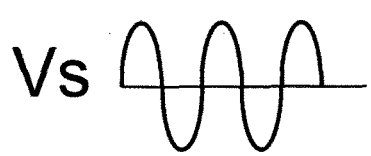
Figure 9:
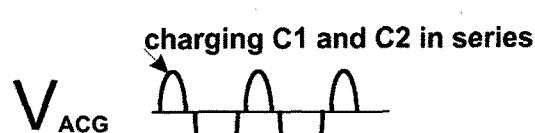

In the FIG. 9 embodiment, which is a variant of FIG. 1, $V_s$ is coupled to capacitor C3, which in turn is coupled to the diodes D1, D2 and D3.

This circuit operates as a voltage intensifier gaining $V_s$.

It order to understand how the circuit in FIG. 5 operates, it is assumed that the left terminal is positive and the right terminal is negative.

It is also assumed that no charging is present at capacitors C1 and C2.

In this case the diodes D1, D2, D3 will shorten the capacitors C1 and C2, leading to charging of capacitor C3 in the first positive period of the voltage $V_s$. When the polarity of $V_s$ in the second half of the period is negative, the capacitor C3 will be coupled in series with $V_s$, resulting in a doubling of the output voltage leading to charging of the capacitors C1 and C2 to half the voltage output. When the next period of $V_s$ is present, the now charged capacitors C1 and C2 will discharge in parallel to the capacitor C3.

In this way the voltage in C3 will be increased due to the repeating contribution from the voltage from the capacitors and $V_s$ itself.

The ACG circuit produces asymmetry between charging and discharging on capacitor C3.

The amount of voltage multiplication in FIG. 5 is determined by $V_S$ multiplied by the amount of capacitors in the ACG circuit.

Figure 10:
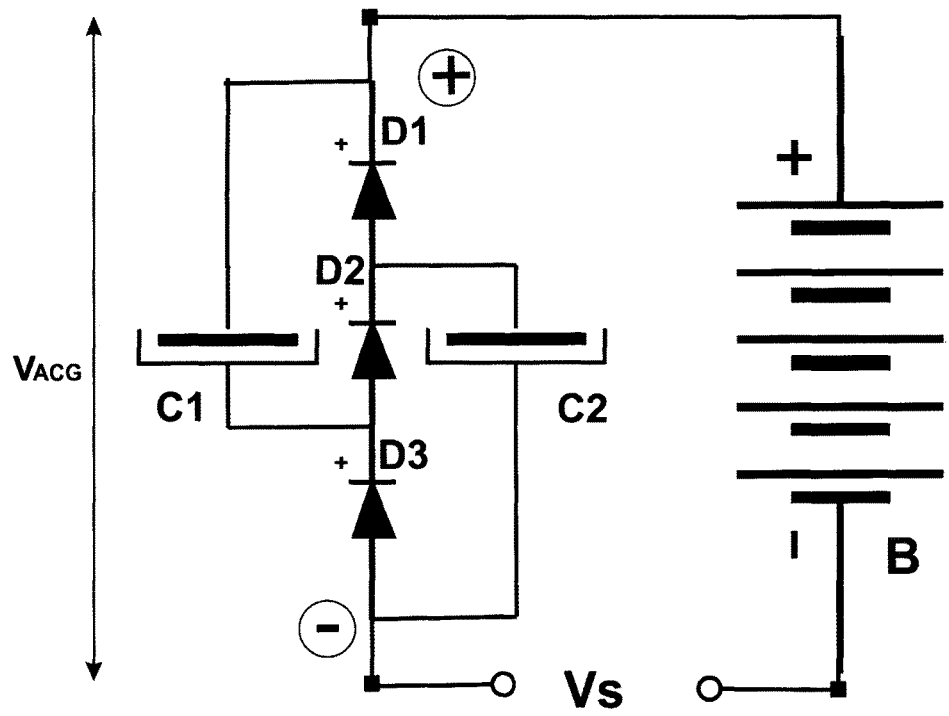
FIG. 10 shows the Asymmetric Current Generator in FIG. 1 coupled to a rechargeable battery.
Figure 10:
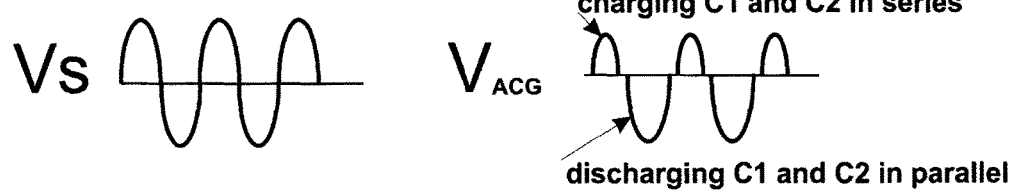

In FIG. 10, a practical use of the ACG circuit is demonstrated.

Compared to the FIG. 5 version, a rechargeable battery is inserted instead of the capacitor C3.

Such a rechargeable battery do not behave as the capacitor C3, but it operates for instance with voltages between 10.8 Volt and 13.5 Volt.

This means that the battery when connected to an ACG circuit, will receive higher amount of charge than it releases.

This again means that it is possible to use a voltage source $V_s$ that is sufficient for a consuming device, and still creating a voltage needed for charging the battery, without increasing the voltage source $V_s$.

Depending of which and how the ACG circuits are dimensioned or multiplied, it is for instance possible to charge a 36 volt battery with voltage source $V_s$ of 2 volt.

Figure 11:
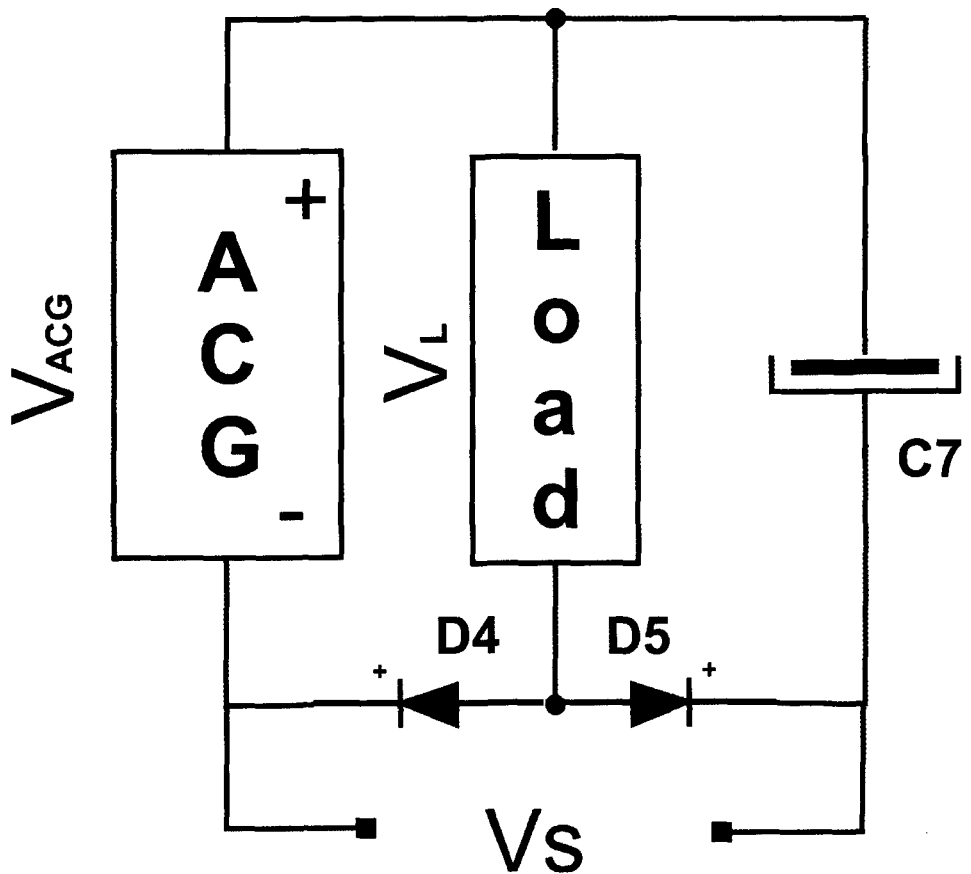
FIG. 11 shows the Asymmetric Current Generator in FIG. 1 coupled to a load.
Figure 11:
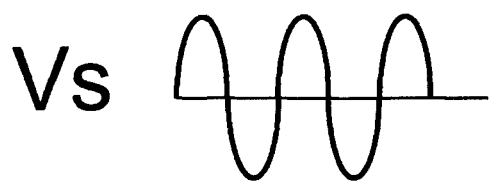
Figure 11:
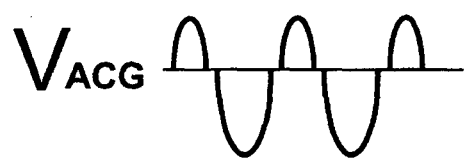
Figure 11:

In FIG. 11 an arrangement of the ACG circuit, where the source $V_s$ is connected to the ACG circuit-$V_s$ is also connected to two diodes D4, D5.

A load is connected between the diodes and the common terminal between the ACG circuit and the capacitor C7. The current passes through the load during each half period of the source $V_s$ such that when the right terminal is positive, the capacitor C7, receives charge from the load and the ACG circuit releases charge. When the right terminal is negative, the capacitor releases charge and the ACG circuit receives charge.

In this way rectifying of current from $V_s$ provides higher voltage and current across the load terminal, compared to using standard method of rectifying current from $V_s$ cf. the shown waveforms.

Figure 12:
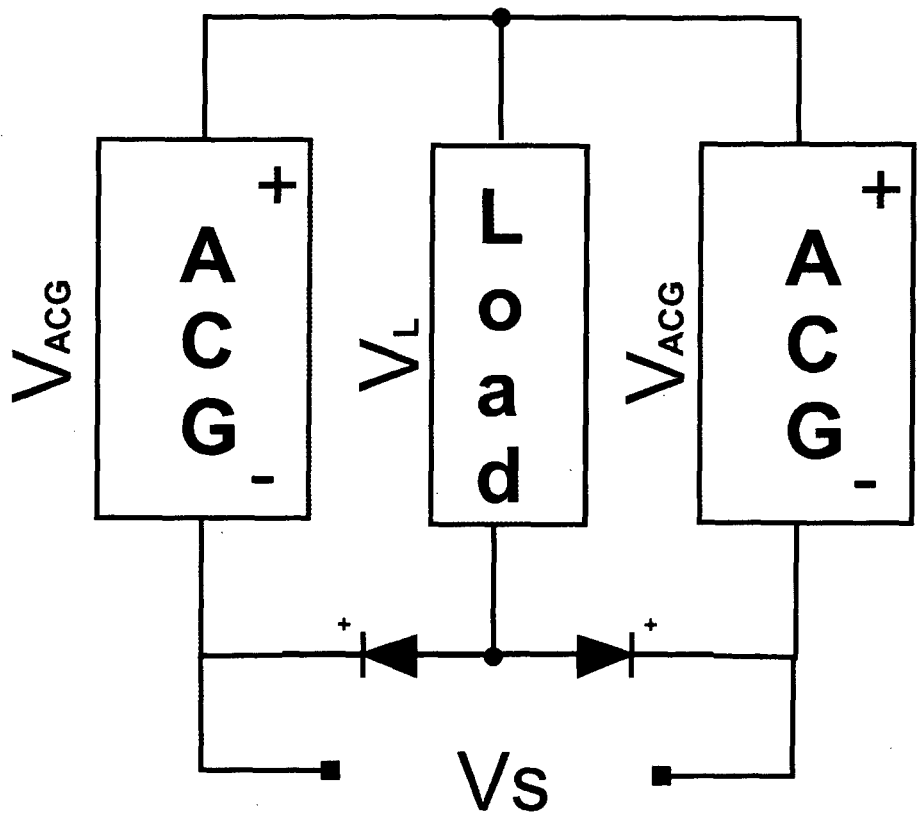
FIG. 12 shows a preferred embodiment of the invention according to the invention.
Figure 12:
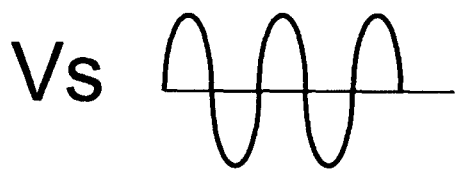
Figure 12:
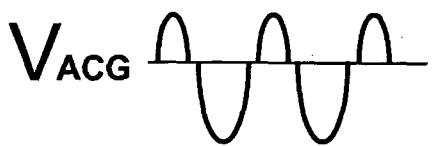
Figure 12:

The arrangement in FIG. 12 differs from that in FIG. 11 in that the capacitor C7 is replaced by another ACG circuit. The function is basically the same as explained in connection with FIG. 7, but with the differences that both periods of the source $V_s$ provides in a shifting manner charging and discharging in the ACG circuit leading to the output as shown.

Figure 13:
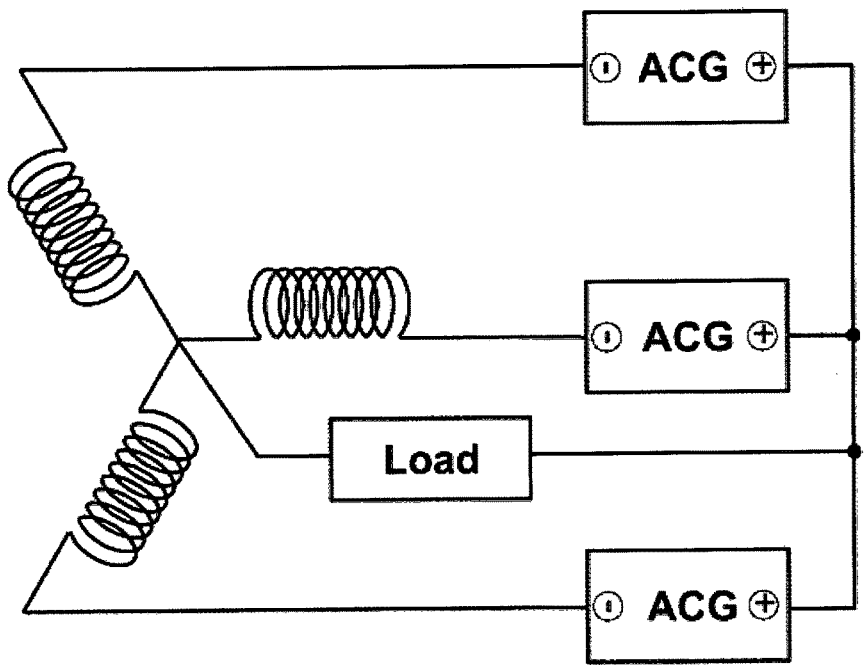
FIG. 13 shows the Asymmetric Current Generator used in a three phase net.

In FIG. 13 is shown an arrangement in which a load is connected to a 3 phase network in an "Y" coupling. The operation is similar to the operation of the above mentioned one phase networks.

Figure 14:
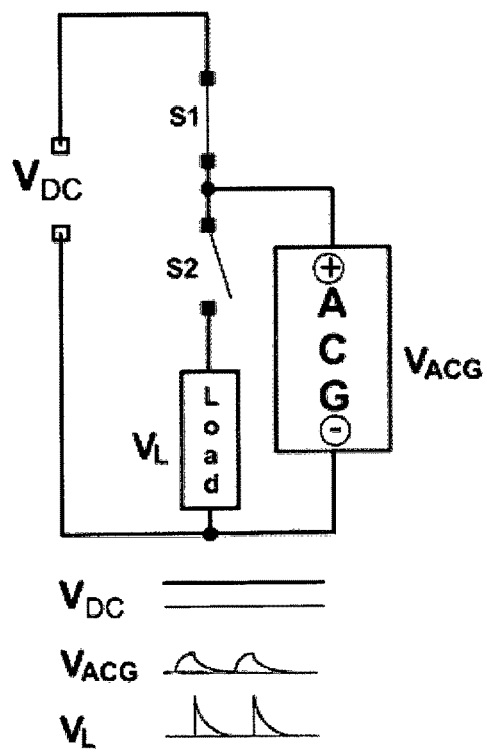
FIG. 14 shows the circuit in FIG. 7 in which a DC voltage and a switching arrangement is coupled to the Asymmetric Current Generator.

Now to FIG. 14.

This embodiment shows an arrangement where a load is coupled in series with a switch S2, said series coupling is connected respectively in parallel with an ACG circuit and a series coupling of a switch S1 and source $V_{DC}$. As can be seen from the figure the source $V_{DC}$ a DC voltage.

When the switch S1 is open and the switch S2 is closed, then the capacitors in the ACG circuit will be discharged through the load.

When the switch S1 closed and the switch S2 is open, then the capacitors in the ACG circuit will be charged. It's basically the same operation as it was explained in connection with the FIGS. 6-9.

By driving the switches as explained a push/pull connection is provided.

Figure 15:
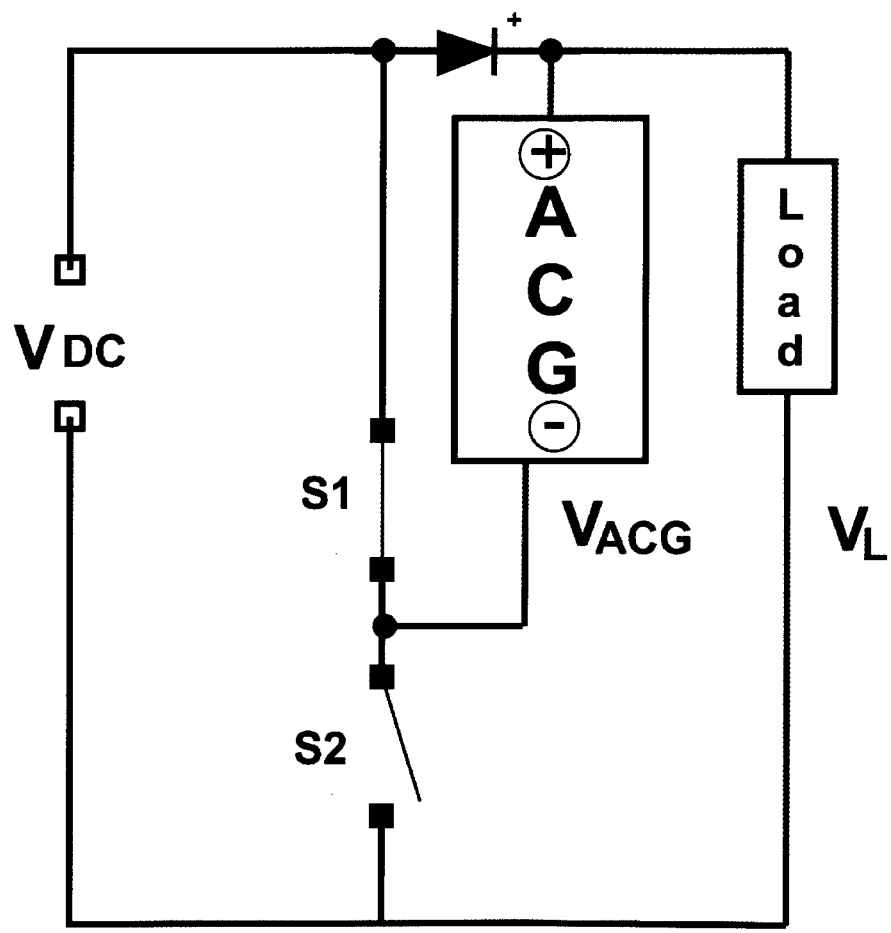
FIG. 15 shows an embodiment of the circuit in FIG. 10.
Figure 15:
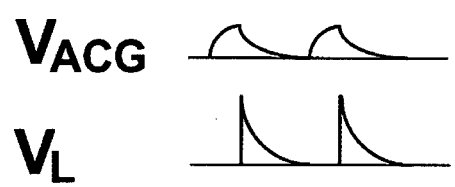

FIG. 15 differs from FIG. 14 in that the load is connected in parallel with $V_{DC}$.

This configuration is suitable in case that the operating voltage of the load is higher or the same as the voltage $V_{DC}$.

When the switch S2 is closed and switch S1 is open, the capacitors of the ACG circuit will be charged.

When the switch S1 is closed and the switch S2 is open, then the capacitors in the ACG circuit will discharge in the load, which at the same time provides a value that is higher than $V_{DC}$.

Figure 16:
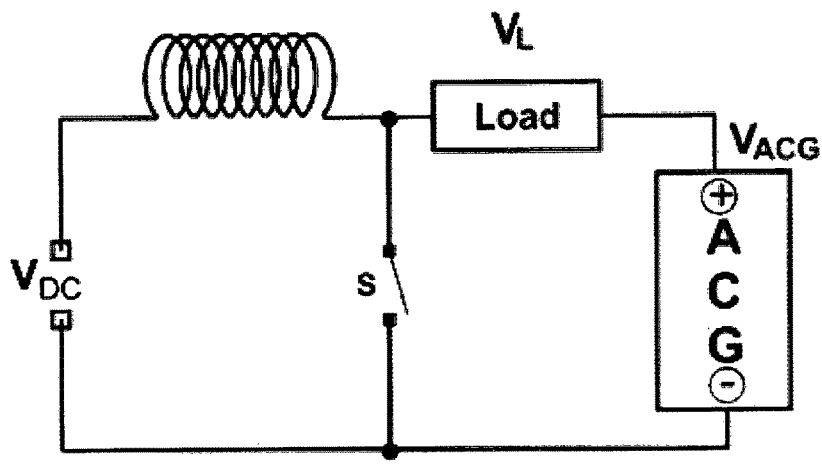
FIG. 16 shows a further embodiment where a DC voltage is led to a load and the Asymmetric Current Generator.
Figure 16:
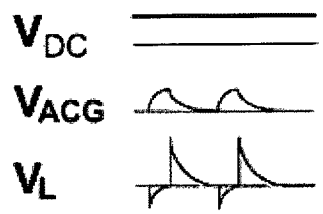

In the FIG. 16 embodiment a switch S is connected in parallel with a series coupling of a load and an ACG circuit. The switch is further coupled in parallel with a $V_{DC}$ source and a coil.

This arrangement operates as follows:

When switch S is closed, the current passes from $V_{DC}$ source through the coil which creates an electromagnetic field around the coil and stores energy in the coil. In the same time, through the switch S, the capacitors inside the ACG circuit discharges through the load.

When switch S is open, the electromagnetic field around the coil will collapse resulting in producing a high voltage which discharges through the load and the capacitors in the ACG circuit. This will be repeated when the switch is closed, and again when the switch is opened.

Figure 17:
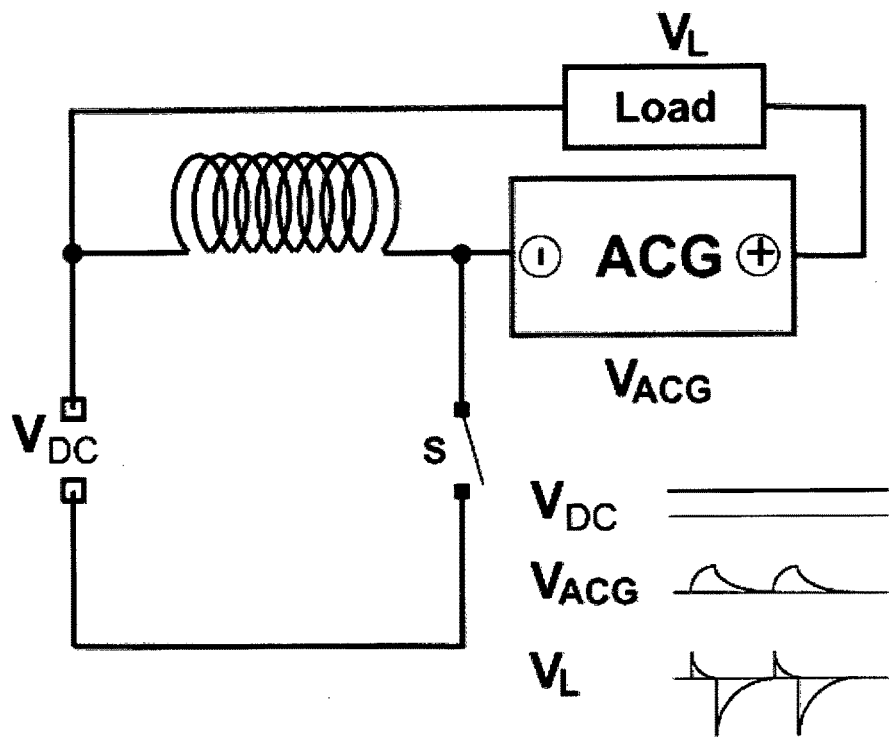
FIG. 17 shows another embodiment where a DC voltage is led to a load and the Asymmetric Current Generator.

In FIG. 17 it is seen that a load is coupled in series with an ACG circuit. It is also seen that the ACG circuit and the load is in parallel with a coil. A voltage $V_{DC}$ is supplied to the common point of the coil and the load. A switch is coupled to the common point between the coil and the ACG circuit.

When the switch S is closed, the current from the $V_{DC}$ source runs through the load and the ACG circuit in which the capacitors in the ACG circuit are charged. At the same time an electromagnetic field is build up around the coil. When the switch S opens, the electromagnetic field around the coil collapses and produces a higher voltage, which discharges in series with the ACG circuit through the load. The load is supplied with a higher Voltage than $V_{DC}$ in the same way, as it was explained in connection with the foregoing figures.

Figure 18:
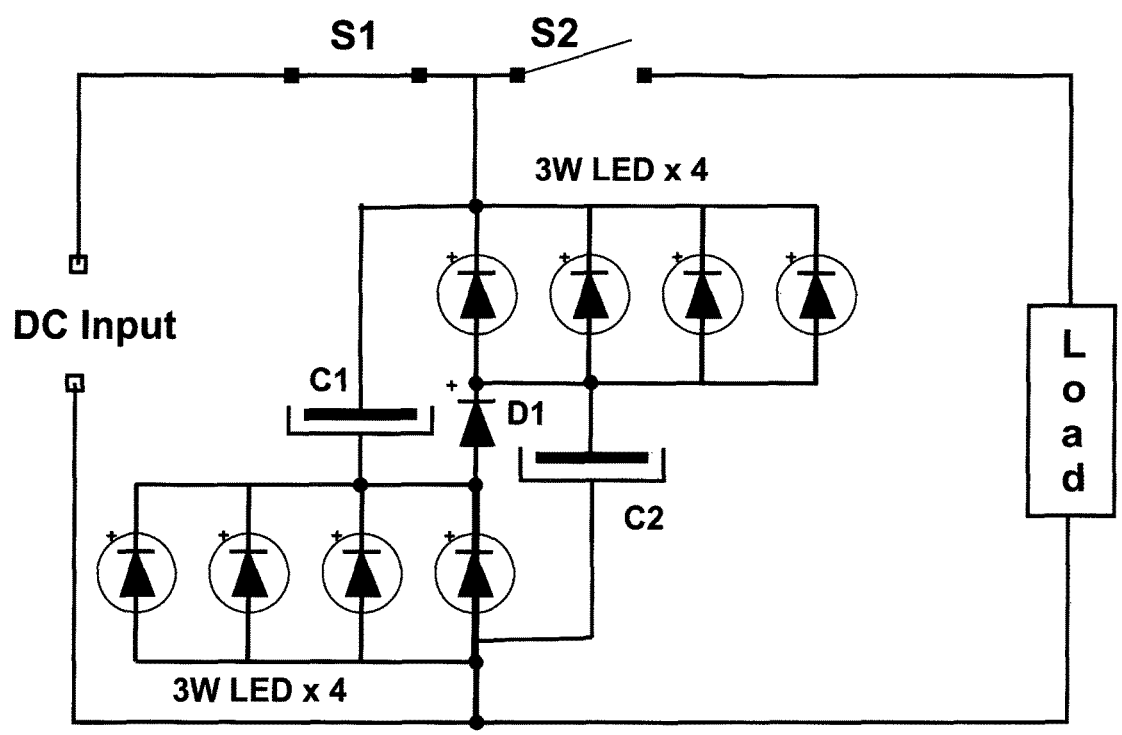
FIG. 18 shows a light source like that in FIG. 3, but with eight LED's.

In FIG. 18 is shown a light source consisting of eight light emitting diodes where four of them are parallel coupled and in series with capacitor C1 and the remaining LED diode are coupled in series with the capacitor C2.

The function of this light source is similar to that of the FIG. 3 embodiment.

Even though the invention is explained in connection with passive components, it is clear within the scope of the claims that the invention could be implemented with active components, such as transistors replacing the diodes or the like.

The invention claimed is:

1. A circuit adapted to supply a voltage to an electronic device, such as a load $V_L$, said voltage being derived from a voltage $V_s$ that has a periodic cycle with a period having a positive part and a negative part, and the voltage $V_s$ is fed to a series coupling of the load $V_L$ and the input of a circuit Asymmetric Current Generator (ACG), wherein said load $V_L$ and said input of said circuit ACG are series-coupled at a common terminal and said voltage $V_s$ is fed to a further terminal of said load $V_L$ that is opposite of said common terminal, wherein said circuit consists of three serial coupled diodes (D1, D2, D3) and two capacitors, wherein one of the capacitors is connected in parallel with two of the diodes (D1, D2) and the other capacitor is connected in parallel with two of the other diodes (D2, D3), or said circuit consists of a serial coupling of at least two light-emitting diodes (LED's) and one extra diode, said diodes being coupled to two impedances comprising two capacitors or coils (L1, L2), where one of the impedances is connected in parallel with two of the diodes, and the other impedance is connected in parallel with two of the other diodes.

2. The circuit according to claim 1, including a further Asymmetric Current Generator (ACG) connected in parallel with one or both of two of the diodes.

3. The circuit according to claim 1, wherein the extra diode (D1) is a light-emitting diode.

4. The circuit according to claim 1, including a rechargeable battery coupled between the voltage Vs and the Asymmetric Current Generator (ACG).

5. The circuit according to claim 1, wherein the voltage Vs is connected to a series coupling of two diodes (D4, D5) and a parallel coupling of the Asymmetric Current Generator (ACG) and a capacitor and wherein one terminal of a load is connected to the parallel coupling, whereas the other terminal is connected between the diodes.

6. The circuit according to claim 5, wherein $V_S$ is a DC voltage $V_{DC}$ that is coupled in series with two switches (S1, S2) and the load, and the Asymmetric Current Generator (ACG) is connected in parallel with the switch (S2) and the load.

* * * * *